(12) United States Patent
Mobley

(10) Patent No.: US 10,292,401 B2
(45) Date of Patent: May 21, 2019

(54) LOBSTER CLEANING TOOL

(71) Applicant: Scott Jacob Mobley, Davie, FL (US)

(72) Inventor: Scott Jacob Mobley, Davie, FL (US)

( * ) Notice: Subject to any disclaimer, the term of this patent is extended or adjusted under 35 U.S.C. 154(b) by 0 days.

(21) Appl. No.: 15/081,563

(22) Filed: Mar. 25, 2016

(65) Prior Publication Data

US 2017/0273322 A1    Sep. 28, 2017

(51) Int. Cl.
*A22C 29/00* (2006.01)
*A22C 29/02* (2006.01)
*B25G 1/10* (2006.01)

(52) U.S. Cl.
CPC .......... *A22C 29/027* (2013.01); *A22C 29/022* (2013.01); *B25G 1/102* (2013.01)

(58) Field of Classification Search
CPC ..... A22C 29/024; A47G 21/061; A47G 21/06
USPC .................... 452/1–6, 11–114, 120, 122, 119
See application file for complete search history.

(56) References Cited

U.S. PATENT DOCUMENTS

| | | | | |
|---|---|---|---|---|
| 901,805 A * | 10/1908 | Grosser | ................ | A22C 25/025 452/105 |
| 2,512,290 A * | 6/1950 | Spang | ................. | A22C 21/063 452/117 |
| 2,635,283 A * | 4/1953 | Prudden | ................. | A22C 29/00 452/11 |
| 3,178,765 A * | 4/1965 | Gorton, Jr. | ........... | A22C 25/025 452/3 |
| 3,271,814 A * | 9/1966 | Gorton, Jr. | ........... | A22C 29/024 452/3 |
| 3,751,761 A * | 8/1973 | Weiland | ............... | A22C 25/006 452/117 |
| 4,048,696 A * | 9/1977 | Maschio | .............. | A22C 29/024 452/5 |
| 4,524,490 A * | 6/1985 | Newville | ............. | A22C 29/024 452/6 |
| 5,122,090 A * | 6/1992 | van de Nieuwelaar | ..................... | A22C 21/06 452/116 |
| 6,036,596 A * | 3/2000 | Lay | ...................... | A22C 29/024 452/17 |
| 6,213,864 B1 * | 4/2001 | Griffiths | ............... | A22B 5/0094 452/116 |
| 7,976,365 B1 * | 7/2011 | King | .................... | A22C 29/027 452/6 |
| 2010/0173574 A1 * | 7/2010 | Gass | .................... | A22C 21/063 452/117 |

* cited by examiner

*Primary Examiner* — Richard T Price, Jr.

(57) ABSTRACT

The present invention is a tool used to clean and remove the lobster's intestinal tract, effortlessly and safely. The present lobster cleaning tool is made of high tensile strength plastic. It has a plastic handle with a soft rubber non-slip grip built for comfort. Attached to the handle is a shaft with a set of plastic barbs attached to it. These are used to attach to the intestinal tract inside the lobster tail. The tool is designed with a tamper proof plastic clear cover for safety purposes.

2 Claims, 6 Drawing Sheets

LOBSTER CLEANING TOOL

CROSS-REFERENCE TO RELATED APPLICATIONS

The present application relates and claims priority to U.S. provisional patent application No. 62/246,091 filed on Oct. 25, 2015.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present invention relates to a tool for cleaning all lobster species.

Description of the Related Art.

There was no proper way to clean a lobster. Past methods may lead to injury from improper handling of kitchen knives or utensils and tend to be time consuming and unsafe.

BRIEF SUMMARY OF THE INVENTION

The present invention is a lobster cleaning tool designed to remove the intestinal tract from the lobster's tail safely, and effectively. The present invention is made of plastic. It has a plastic handle with a soft rubber, non-slip grip built for comfort. Attached to the handle is a plastic shaft with a set of plastic barbs attached to it. The lobster cleaning tool of the present invention is designed with a tamper proof plastic clear cover for safety purposes.

DESCRIPTION OF THE DRAWINGS

For a more complete understanding of the present invention, reference is now made to the following descriptions.

REFERENCE NUMERALS IN THE DRAWINGS

For a more complete understanding of the present invention parts, reference is now made to the following descriptions:

1—The lobster cleaning tool of the present invention that is a hand held plastic device.
2—The rubber handle.
3—The plastic shaft.
4—The plastic barbs.
5—The plastic clear cover.
6—The lobster.
7—The lobster's head.
8—The lobster's tail.
9—The lobster's anus.
10—The lobster's intestinal tract.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The present invention is a tool used to clean and remove the intestinal tract located inside the tail of all lobsters species for easy preparation to be cooked. The lobsters intestinal tract will be removed effortlessly and replaces every alternative cleaning method.

Figure 1:
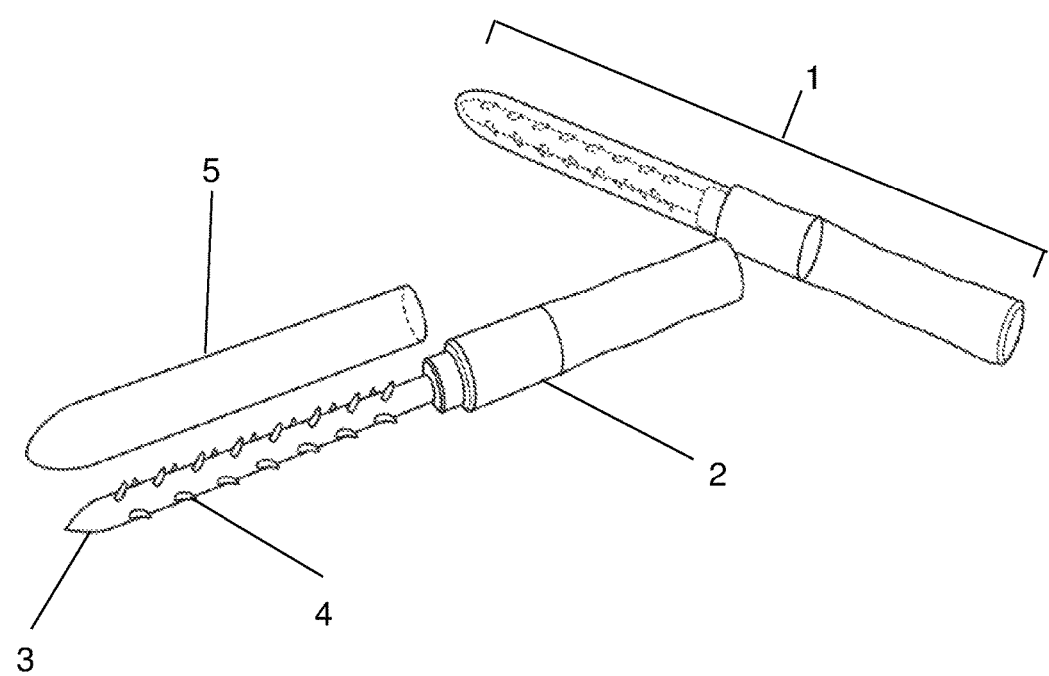
FIG. 1 Is to show all the parts of the lobster cleaning tool of the present invention that is a hand held plastic device.

Referring to FIG. 1 the present invention is a hand held plastic device 1. It has a rubber handle 2 for comfort and mobility. Attached to the handle is a plastic shaft 3 with a set of plastic barbs 4. They are designed to attach the intestinal tract 10 inside the lobster's tail 8, for removal as explained in FIG. 6. There is a plastic clear cover 5 to cover the hand held plastic device 1 after the use period. It is for child safety and to protect from injury to the user from the plastic shaft 3 and the plastic barbs 4.

Figure 2:
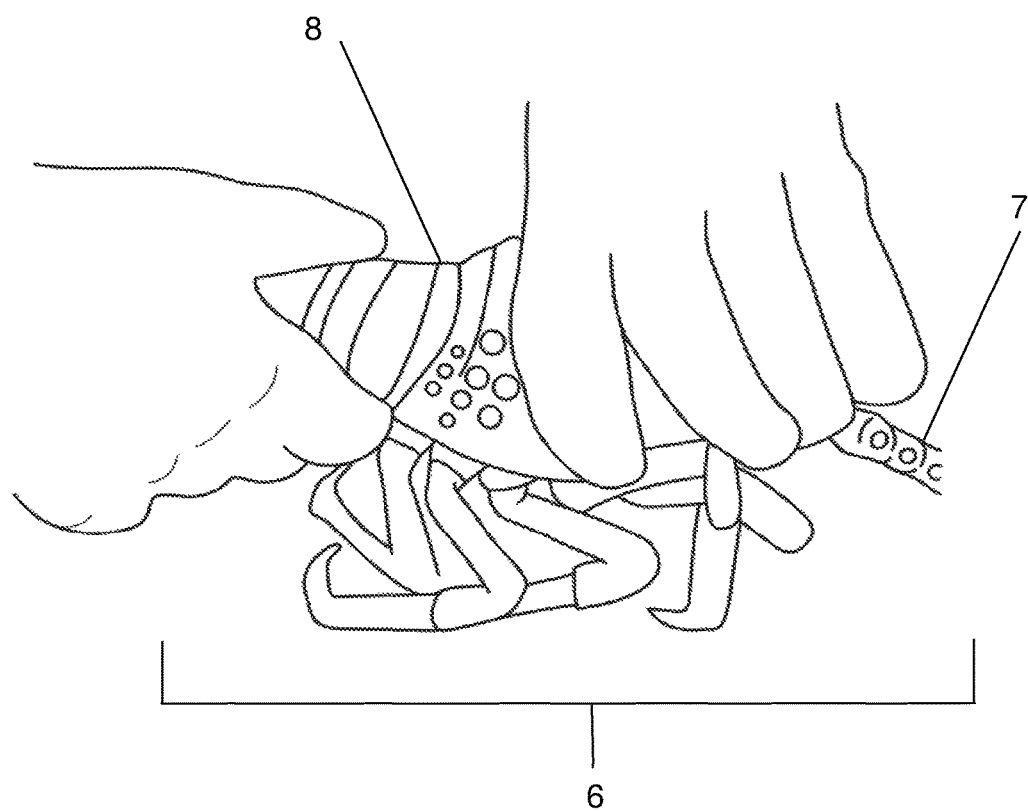
FIG. 2 Is to show how we will prepare the lobster to be cleaned by removing the lobster's head.

To clean a lobster using the lobster cleaning tool of the present invention we will follow these steps:

1. Referring to FIG. 2 we will prepare the lobster 6 by removing the lobster's head 7.

Twist or cut it off with a knife to remove the lobster's head 7 from the lobster's tail 8. You may keep the lobster's head 7 on, if you prefer.

Figure 3:
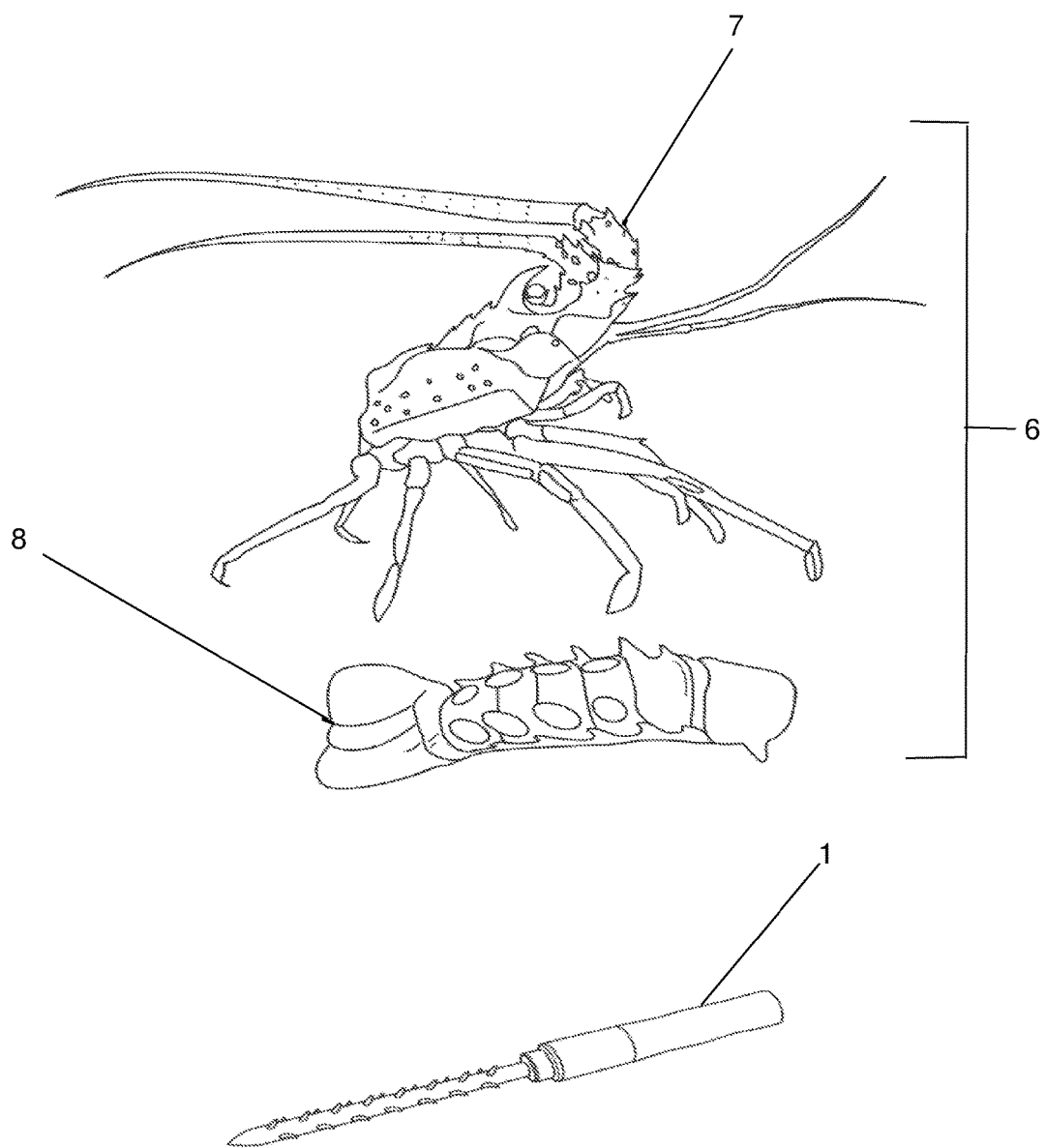
FIG. 3 Is to show the lobster with the lobster cleaning tool.

Referring to FIG. 3 this is the lobster 6 after we remove the lobster's head 7 from the lobster's tail 8, and the hand held plastic device 1 to be ready to clean the lobster 6.

Figure 4:
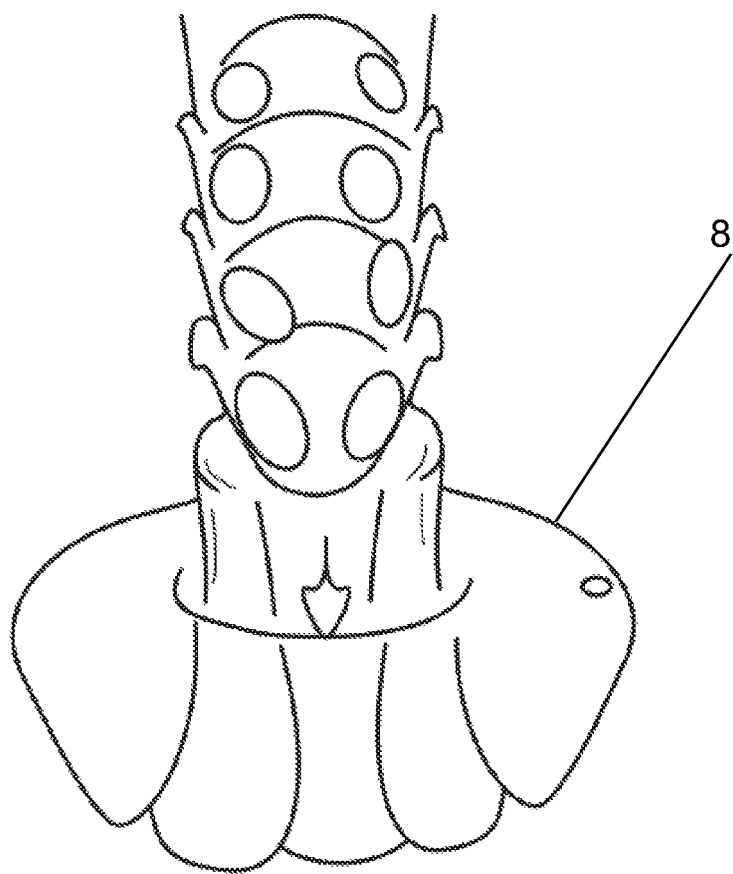
FIG. 4 Is to show how we will take the lobster tail and turn it upside down, belly up.

2. Referring to FIG. 4 we will take the lobster tail 8 and turn it upside down, belly up.

Figure 5:
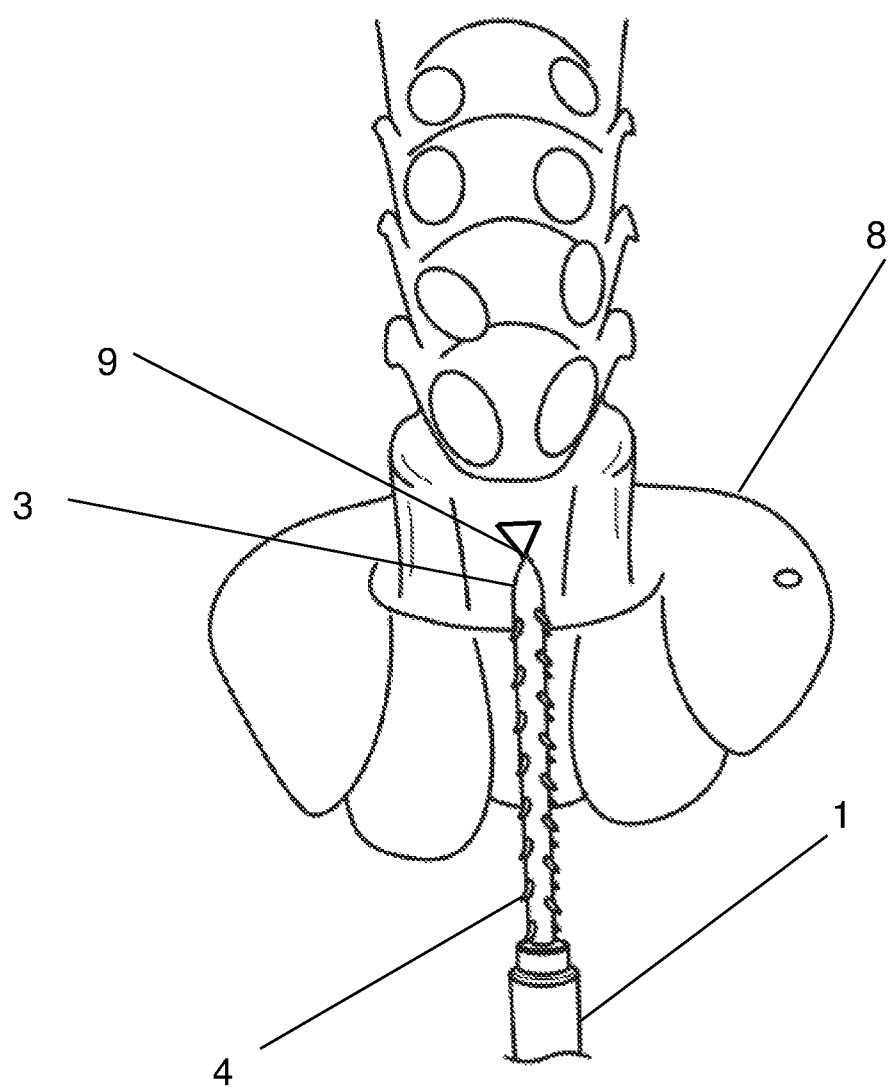
FIG. 5 Is to show how we locate the lobster's anus and how we will use the lobster cleaning tool of the present invention that is a hand held plastic device.

3. Referring to FIG. 5 locate the lobster's anus 9. The plastic shaft part 3 of the tool, with the plastic barbs 4, will be inserted inside the lobster's anus 9. We will insert the lobster cleaning tool of the present invention that is a hand held plastic device 1 into the lobster's anus 9, about half way. Rotate the tool either clockwise or counter clockwise, for half a turn. Hold the lobster's tail 8, and pull the lobster cleaning tool of the present invention that is a hand held plastic device 1 straight out.

Figure 6:
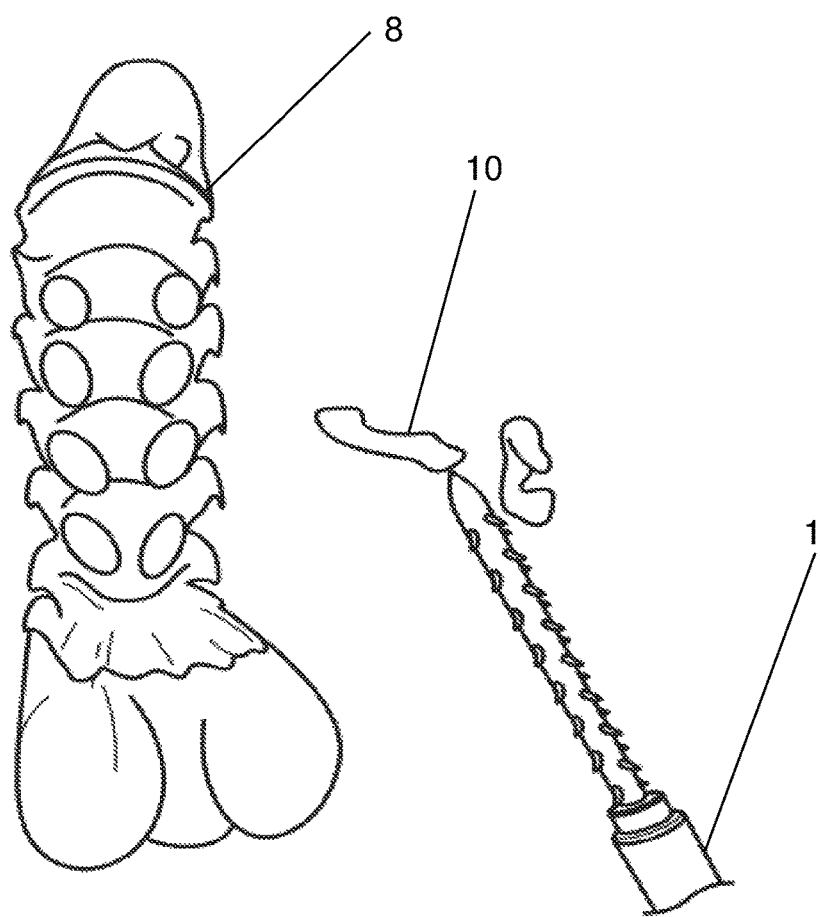
FIG. 6 Is to show how the lobster's intestinal tract attaches to the lobster cleaning tool after inserted and removed from the lobsters anus.

Referring to FIG. 6 after we pull the lobster cleaning tool of the present invention that is a hand held plastic device 1 straight out of the lobster's tail 8, the the lobster's intestinal tract 10 will be attached to the end of the lobster cleaning tool of the present invention that is a hand held plastic device 1.

Once the intestinal tract 10 is removed, the lobster 6 is ready to be cooked or stored for future cooking.

The invention claimed is:

1. A lobster cleaning tool designed to remove the intestinal tract located inside the tail of all lobster species safely, and effectively for easy preparation to be cooked, the present lobster cleaning tool consists of:

a handle made from plastic with a soft rubber and non-slip grip built for comfort;

a shaft made from plastic attached to the handle with a set of plastic barbs attached to the shaft; and a clear cover made from plastic for safety purposes, the clear cover can be used when the lobster cleaning tool is stored.

2. The following steps should be followed to use the lobster cleaning tool of claim 1:

prepare lobster by removing the lobster's head, twist or cut the lobster off with a knife to remove the lobster's head from the lobster's tail;

take the lobster tail and turn the lobster upside down, belly up; and locate the lobster's anus by inserting the shaft including a set of plastic barbs into the lobster's anus, about half way, rotate the lobster cleaning tool either clockwise or counter clockwise, for half a turn, hold the lobster's tail, and pulling the lobster cleaning tool straight out of the lobster's tail, the lobster's intestinal tract will be attached to the plastic barbs of the shaft, once the intestinal tract is removed, the lobster is ready to be cooked or stored for future cooking.

* * * * *